United States Patent
Checchetti

[11] 3,835,316
[45] Sept. 10, 1974

[54] DEVICE FOR ELECTRONICALLY DETECTING PRESSURE CHANGES IN A FLUID

[76] Inventor: Maurizio Checchetti, Piazza Sicilia, 6, Milan, Italy 20146

[22] Filed: Sept. 13, 1973

[21] Appl. No.: 396,747

[30] Foreign Application Priority Data
Sept. 25, 1972 Italy.................................. 29641/72

[52] U.S. Cl............................ 250/231 P, 250/237
[51] Int. Cl. ............................................. G01d 5/34
[58] Field of Search ............ 250/231 P, 231 R, 237, 250/239; 340/240

[56] References Cited
UNITED STATES PATENTS
| | | | |
|---|---|---|---|
| 3,134,907 | 5/1964 | Volberg | 250/237 |
| 3,590,261 | 6/1971 | Snook | 250/231 P |
| 3,628,024 | 12/1971 | Ciemochowski | 250/231 P |
| R25;258 | 10/1962 | Asten | 250/239 |

*Primary Examiner*—Walter Stolwein

[57] ABSTRACT

A device for electronically detecting pressure changes in a fluid is disclosed. The device comprises a movable plunger fast with a perforated movable diaphragm, on one side having a light source and on the other side a stationary screen with at least one shaped aperture beyond which a photoresistor is arranged and connected to an electric circuit for transforming the optical signal into an electric signal.

4 Claims, 2 Drawing Figures

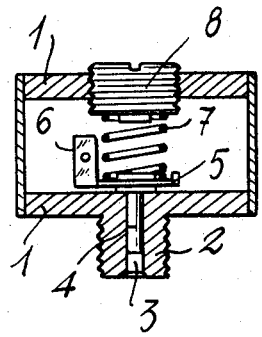
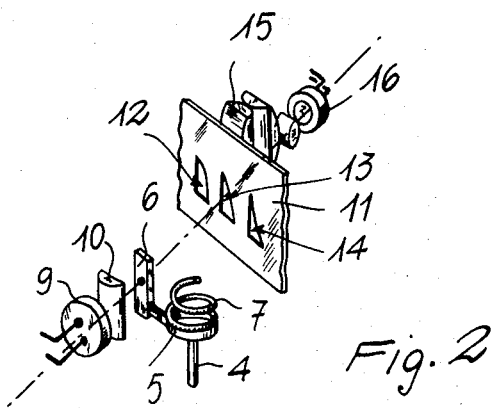

DEVICE FOR ELECTRONICALLY DETECTING PRESSURE CHANGES IN A FLUID

This invention relates to a device for electronically detecting pressure changes in a fluid, and more particularly is concerned with a highly sensitive optical-electronic pressure transducer.

There is often the need of detecting fluid pressures and converting such pressures into electronic signals which can be directly read or stored, or used for automatically adjusting mechanical or electrical members.

In this type of prior art devices, use is made of a capacitative, or piezoelectric or magnetic transducer, such systems involving a complex electronics for detecting and using the signal into which the pressure of the controlled fluid has been converted. These systems have a high response frequency that however is only seldom required.

The use is also often resorted to of simple potentiometer devices, the signal of which can generally be immediately used, but such devices have unsuitable durability and reliability for industrial demands.

It is the main object of the present invention to provide a device of a simple structure and reliable in operation, having very high durability and reliability, by means of which fluid pressures can be converted into directly usable electric signals.

It is another object of the invention to provide a device of the above character, provided with high sensitivity and enabling to modulate the signal generated by the fluid pressure detection, so that said signal will respond to determined characteristics for automatic adjustment requirements.

These and still other objects are accomplished by a device comprising a plunger movable within a cylindrical seat under the action of the pressure to be controlled or checked and against a calibrated spring, wherein said plunger is fast with at least one movable diaphragm, the latter being perforated, at one side of which a light source is located, and at the other side of which a stationary screen is located and has at least one shaped hole or aperture, beyond which a photoresistor is provided and connected to an electric circuit for transforming the optical signal into an electric signal.

In the case, the perforated diaphragm could be replaced by a movable mirror.

For a better understanding of the structure and features of the device according to the invention, an embodiment thereof will now be described by mere way of not limiting example, reference being had to the accompanying drawing, in which:

FIG. 1 is a fragmentary schematic sectional view showing a portion of the device; and FIG. 2 is a fragmentary schematic perspective view showing the device as a whole.

The device comprises a rigid housing 1, from which an externally threaded hollow tubular extension projects, the latter being directly attachable to a tube, vessel or the like, containing therein a fluid, the pressure of which is to be checked.

A plunger 4 is accomodated within the cavity 3 of said extension 2 and freely axially movable by the action of the fluid pressure in the cavity 3, a pan 5 carrying a movable diaphragm 6 being fast with said plunger 4. A hole, as clearly shown in the drawing, is formed in said diaphragm. One end of a spring 7 abuts on the pan 5, while the other end of this spring is acted upon by a screw 8, it being possible to accurately adjust thereby the pressure exerted by the spring on the pan 5.

Obviously, the rigid housing containing the device should be tight sealed to prevent any powder or extraneous particles from penetrating therein.

Referring now to FIG. 2, it will be seen that in front of the movable diaphragm 6 a light source 9 is positioned with the interposition of a cylindrical condenser 10 comprising normal lenses. The light source 9 preferably comprises an LED, that is a luminescent diode, which among the several advantages provides a readily adjustable, extremely constant brilliancy through a very long life, does not heat, and the emitted monochromatic lights are quite consistent with the LDR, or photoresistors, used for detection which, in turn, have a resistance inversely proportional to the illimination.

At the other side of diaphragm 6, a stationary screen 11 is arranged, in which a set of shaped holes or apertures 12, 13 and 14 are formed. One of these holes or apertures is positioned in front of the diaphgram 6, while beyond this aperture a cylindrical optical condenser 15 is positioned in front of a photoresistor 16 connected to an electric circuit.

During the operation of the transducer, the light beam emitted by the source 9 and condensed by condenser 10 passes through the small hole of diaphragm 6 and then also through one of the holes or apertures of screen 11 and condenser 15 to strike on the photoresistor 16 which converts the optical signal into an electrical signal, in the case to be linearly amplified, and which is directly usable both for direct reading and registering of the pressure values, and for automatically adjusting mechanical or electrical members.

Should the fluid pressure increase, the plunger 4 would raise against the reaction of spring 7, and hence also the diaphragm 6 would raise, so that the light beam can be intercepted by the screen 11, thereby causing a decrease in the electric signal generated by the photoresistor 16.

The apertures 12, 13 and 14 on the screen 11 have profiles differing from one another, so that the electric signal generated by the photoresistor 16, the changes in the fluid pressure being unaltered, can respond to different characteristics for automatic adjustment requirements, depending on which of said apertures 12, 13 and 14 is interposed between the diaphragm 6 and the photoresistor.

It should be noted that, in order to increase the transducer sensitivity by reducing the stroke of the plunger 4 and hence the kinetic energy thereof, as well as the size of said transducer and spring, the detected signal is amplified by the light beam on the ground of the distance ratio between the light source 9 and diaphragm 6 and between the latter and the screen 11 (actually between said screen and the optical center of the cylindrical condensers 15).

Finally, it should be noted that the transducer sensitivity could be also increased by preloading the reaction spring 7, so that the transducer operates within a predetermined pressure range.

What I claim is:

1. A device for electronically detecting pressure changes in a fluid, comprising:

a plunger axially movable within a tubular seat under the action of the pressure to be detected;

a calibrated spring acting against the movement of said plunger caused by said pressure;

at least one movable perforated diaphragm affixed to said plunger;

a luminiscent diode light source located on one side of said diaphragm;

a screen positioned on the other side of said diaphragm and having a plurality of differently shaped holes or apertures formed therein, said screen being movable on a rigid structure for selectively positioning one of said holes or apertures in fixed alignment with said source and said plunger; and a photoresistor positioned on the side of said screen opposite said source for connection to an electric circuit for transforming the optical signal received from said source into an electric signal.

2. A device as claimed in claim 1, wherein said electric circuit comprises a linear amplifier.

3. A device as claimed in claim 1, wherein condensing lenses for the beam from the light source are arranged between the light source and movable diaphragm and between the screen and photoresistor, respectively.

4. A device as claimed in claim 1, wherein said spring reacting on the movable plunger is a preloaded spring.

* * * * *